US012756067B2

(12) United States Patent
Tong et al.

(10) Patent No.: US 12,756,067 B2
(45) Date of Patent: Oct. 6, 2026

(54) SEPARATOR FOR SECONDARY BATTERY AND PREPARATION METHOD THEREFOR, SECONDARY BATTERY, BATTERY MODULE, BATTERY PACK, AND POWER CONSUMING DEVICE

(71) Applicant: CONTEMPORARY AMPEREX TECHNOLOGY (HONG KONG) LIMITED, Hong Kong (CN)

(72) Inventors: Xing Tong, Ningde (CN); Songjun Shi, Ningde (CN); Youlei Lai, Ningde (CN); Yinghua Zhu, Ningde (CN); Jingru Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 650 days.

(21) Appl. No.: 18/344,980

(22) Filed: Jun. 30, 2023

(65) Prior Publication Data

US 2023/0395938 A1 Dec. 7, 2023

Related U.S. Application Data

(63) Continuation of application No. PCT/CN2022/075173, filed on Jan. 30, 2022.

(51) Int. Cl.

*H01M 50/446* (2021.01)
*H01M 50/403* (2021.01)
*H01M 50/491* (2021.01)

(52) U.S. Cl.

CPC ....... *H01M 50/446* (2021.01); *H01M 50/403* (2021.01); *H01M 50/491* (2021.01)

(58) Field of Classification Search

CPC .......................... H01M 50/446; H01M 50/449
See application file for complete search history.

(56) References Cited

U.S. PATENT DOCUMENTS

2010/0304205 A1 12/2010 Jo et al.
2018/0294461 A1 10/2018 Feng et al.
(Continued)

FOREIGN PATENT DOCUMENTS

CN 104919639 A 9/2015
CN 109755448 A 5/2019
(Continued)

OTHER PUBLICATIONS

International Search Report for International Application No. PCT/CN2022/075173, mailed Aug. 8, 2022.
(Continued)

*Primary Examiner* — Stephan J Essex
(74) *Attorney, Agent, or Firm* — Ladas & Parry LLP

(57) ABSTRACT

Provided are a separator for a secondary battery and a preparation method therefor, and a secondary battery including the separator, a battery module, a battery pack, and a power consuming device. The separator for a secondary battery of the present application includes a substrate layer and a nanofiber layer provided on one surface of the substrate layer. The nanofiber layer includes a lithium supplementing agent, a polymer, and an optional conductive material; and in the total weight of the nanofiber layer, the content of the lithium supplementing agent accounts for 30.0-50.0% by weight, the content of the polymer accounts for 50.0-70.0% by weight, and the content of the conductive material accounts for 0-5.0% by weight.

19 Claims, 4 Drawing Sheets

(56) References Cited

U.S. PATENT DOCUMENTS

| | | | |
|---|---|---|---|
| 2020/0136113 A1 | 4/2020 | Kumta et al. | |
| 2021/0399384 A1 | 12/2021 | Joo et al. | |

FOREIGN PATENT DOCUMENTS

| | | | | |
|---|---|---|---|---|
| CN | 111384428 A | 7/2020 | | |
| CN | 113972368 A | 1/2022 | | |
| WO | WO-2019182364 A1 * | 9/2019 | .......... | H01M 50/403 |

OTHER PUBLICATIONS

Extended European Search Report for EP application No. 22908807.5, dated Oct. 25, 2024.

* cited by examiner

SEPARATOR FOR SECONDARY BATTERY AND PREPARATION METHOD THEREFOR, SECONDARY BATTERY, BATTERY MODULE, BATTERY PACK, AND POWER CONSUMING DEVICE

CROSS REFERENCE TO RELATED APPLICATION

This application is a continuation of International Patent Application No. PCT/CN2022/075173, filed on Jan. 30, 2022, which is incorporated by reference in its entirety.

TECHNICAL FIELD

The present application relates to the technical field of secondary batteries, and more particularly, to a separator for a secondary battery, a method for preparing the separator, as well as a secondary battery including the separator, a battery module, a battery pack, and a power consuming device.

BACKGROUND

In recent years, with the increasing application range of lithium ion batteries, lithium ion batteries are widely used in energy storage power systems such as hydroelectric, thermal, wind and solar power stations, as well as electric tools, electric bicycles, electric motorcycles, electric vehicles, military equipment, aerospace and other fields. Due to the great development of lithium ion batteries, higher requirements have also been placed on the lithium ion batteries in terms of energy density, cycling performance, safety performance, etc.

A lithium supplementing agent has been applied to a separator for a secondary battery in the prior art to form a composite separator including a lithium supplementing agent layer, with the intention of improving an initial discharge capacity of the secondary battery, reducing capacity attenuation of the battery and prolonging the battery life. Currently, the lithium supplementing agent may include an inner core and an organic-inorganic shell layer, the inner core includes a lithium-rich compound, and the organic-inorganic shell layer may include a polymer and an inorganic compound containing a silicon-oxygen bond. Coating the surface of the inner core of the lithium supplementing agent with the organic-inorganic shell layer can not only play a coating effect to isolate the inner core from air/oxygen, but can also allow the inner core to be released after liquid injection, and the lithium-rich compound in the inner core can participate in a film-forming reaction of a negative electrode to form an SEI film on the surface of the negative electrode, thereby reducing irreversible lithium consumption of a positive electrode, and thus improving the initial discharge capacity. Meanwhile, the lithium-rich compound from the inner core can also act as active lithium, and when there is insufficient active lithium in a cycling process, the active lithium stored in the negative electrode can participate in an electrochemical reaction in a timely manner, thereby reducing the capacity attenuation of the battery and prolonging the battery life.

However, in a core-shell structure in the prior art, the inorganic-organic shell layer of an outer layer may hinder an electron conduction path of the lithium-rich compound of the inner core, resulting in that a lithium-rich oxide is difficult to participate in an oxidation reaction during formation and that the utilization efficiency of the lithium supplementing agent is not high. Moreover, in the composite separator, the surface of a separator substrate layer is coated with the lithium supplementing agent layer, which inevitably causes that pores of the separator substrate are blocked, hindering the migration of lithium ions in the separator. Furthermore, when the organic-inorganic shell layer on the surface of the lithium supplementing agent swells/dissolves under the action of an electrolyte, lithium ions in the inner core are gradually released to facilitate dissolution of methyl orthosilicate, ethyl orthosilicate, tetrapropoxysilane and other substances while a lithium supplementing rate is controlled, increasing the viscosity of the electrolyte, thereby hindering the migration of the lithium ions in the electrolyte.

Therefore, the composite separator in the prior art still needs to be improved on the aspect of improving the utilization efficiency of the lithium supplementing agent while sufficiently ensuring the migration of the lithium ions inside the battery.

SUMMARY

In view of the above-mentioned problems existing in the prior art, an object of the present application is to provide a separator for a secondary battery, which significantly improves the utilization efficiency of a lithium supplementing agent and the migration rate of lithium ions, so as to improve the first coulombic efficiency of the secondary battery using the separator and reduce capacity attenuation of the battery.

In order to achieve the above object, in a first aspect, the present application provides a separator for a secondary battery, including:

a substrate layer; and a nanofiber layer provided on one surface of the substrate layer, the nanofiber layer including a lithium supplementing agent, a polymer, and an optional conductive material, wherein in the total weight of the nanofiber layer, the content of the lithium supplementing agent accounts for 30.0-50.0%, the content of the polymer accounts for 50.0-70.0% and the content of the conductive material accounts for 0-5.0% by weight.

Thus, by providing the nanofiber layer as the lithium supplementing agent layer, which includes the lithium supplementing agent, the polymer and the optional conductive material, on one surface of the substrate layer of the separator, when the separator of the present application is applied to the secondary battery, the lithium supplementing agent is slowly released from the nanofiber layer during liquid injection and formation, and participates in a negative electrode film-forming reaction to exert a lithium supplementing effect. More importantly, in the separator for a secondary battery of the present application, the nanofiber layer serving as the lithium supplementing agent layer has a unique nanofiber structure, and continuous lithium ion migration of the lithium supplementing agent in the nanofiber layer can be fully ensured. The polymer in the nanofiber layer and the lithium supplementing agent act synergistically so that the utilization efficiency of the lithium supplementing agent can be improved, the initial discharge capacity of the battery can then be improved, and the capacity attenuation of the battery can be reduced. The optional conductive material in the nanofiber layer can increase electron paths of the lithium supplementing agent in the nanofiber layer, and further improve the utilization efficiency of the lithium supplementing agent, thereby further improving the initial discharge capacity of the battery and further reducing the capacity attenuation of the battery.

In any embodiment, the conductive material includes a zero-dimensional conductive material and an optional one-dimensional conductive material, and in the total weight of the nanofiber layer, the content of the zero-dimensional conductive material accounts for 1.0-5.0% and the content of the one-dimensional conductive material accounts for 0-0.3% by weight.

In any embodiment, the zero-dimensional conductive material has a particle size of 30-50 nm. Optionally, the zero-dimensional conductive material is selected from one or more of carbon black, acetylene black and Ketjen black.

In any embodiment, the one-dimensional conductive material has a length-diameter ratio of 500-1,000. Optionally, the one-dimensional conductive material is a carbon nanotube, and optionally, a single-wall nanotube, a multi-wall nanotube, or a combination thereof.

In any embodiment, the lithium supplementing agent is selected from one or more of $Li_2C_2O_4$, $C_4BLiO_8$, $Li_{15}Si_4$, $Li_4Sn$, $Li_2NiO_2$, LiF, $Li_2TiO_3$, $Li_2CrO_4$, $Li_2Cr_2O_7$, $Li_4SiO_4$, $Li_2SiO_3$, $Li_3AsO_4$, $Li_2SeO_4$, $Li_2SeO_3$, $LiVO_3$, $LiAlO_2$, $Li_3PO_4$, $Li_2B_8O_{13}$, $Li_2B_4O_7$, $LiBO_2$, $Li_3AlF_6$, $Li_2SnF_6$ and $LiAsF_6$, and optionally, one or more of $Li_2NiO_2$, $Li_4Sn$ and $LiAsF_6$.

In any embodiment, the lithium supplementing agent has a particle size of 50-200 nm, and optionally, 80-150 nm.

In any embodiment, in 100 parts by weight of the polymer, the content of the lithium supplementing agent accounts for 40-100 parts by weight, and optionally, 60-80 parts by weight.

In any embodiment, in 100 parts by weight of the lithium supplementing agent, the content of the zero-dimensional conductive material accounts for 1-12.5 parts by weight; and the content of the one-dimensional conductive material accounts for 0.15-0.75 parts by weight.

In any embodiment, the polymer is selected from one or more of polyvinylidene chloride, polyimide, polyacrylonitrile, and polystyrene.

In any embodiment, nanofibers in the nanofiber layer have a diameter of 100-500 nm, and optionally, 200-250 nm.

In any embodiment, the nanofiber layer has a thickness of 1.0-5.0 μm, and optionally, 1.5-2.5 μm.

In any embodiment, the nanofiber layer has a porosity of 80% or above.

In a second aspect, the present application provides a method for preparing a separator for a secondary battery, the preparation method including:

- dissolving a polymer in a solvent to obtain a polymer solution;
- adding the polymer solution to a lithium supplementing agent or a blend of a lithium supplementing agent and a conductive material, and performing high-speed dispersion to obtain a dispersion liquid; and
- attaching the dispersion liquid to one surface of a substrate layer by means of electrostatic spinning to form a nanofiber layer,
- wherein in the total weight of the nanofiber layer, the content of the lithium supplementing agent accounts for 30.0-50.0%, the content of the polymer accounts for 50.0-70.0%, and the content of the conductive material accounts for 0-5% by weight.

In any embodiment, a solid content of the polymer solution accounts for 20-40% by weight, and optionally, 20-25% by weight.

In any embodiment, the nanofiber layer has a thickness of 1.0-5.0 μm, and optionally, 1.5-2.5 μm.

In a third aspect, the present application provides a secondary battery, including:

- a positive electrode;
- a negative electrode;
- an electrolyte; and
- a separator in the first aspect of the present application, wherein
- the nanofiber layer is provided on the surface of the substrate layer facing the positive electrode.

In a fourth aspect, the present application provides a battery module, including a secondary battery in the third aspect of the present application.

In a fifth aspect, the present application provides a battery pack, including a battery module in the fourth aspect of the present application.

In a sixth aspect, the present application provides a power consuming device, including at least one of a secondary battery in the third aspect of the present application, a battery module in the fourth aspect of the present application, and a battery pack in the fifth aspect of the present application.

In the separator for a secondary battery of the present application, by providing the nanofiber layer as the lithium supplementing agent layer, which includes the lithium supplementing agent, the polymer and the optional conductive material, in the form of a nanofiber layer having a high porosity, the utilization efficiency of the lithium supplementing agent is significantly improved, and the migration rate of lithium ions is also improved, thereby significantly improving the first coulombic efficiency of the secondary battery using the separator and reducing the capacity attenuation of the battery.

LIST OF REFERENCE SIGNS

Figure 1:
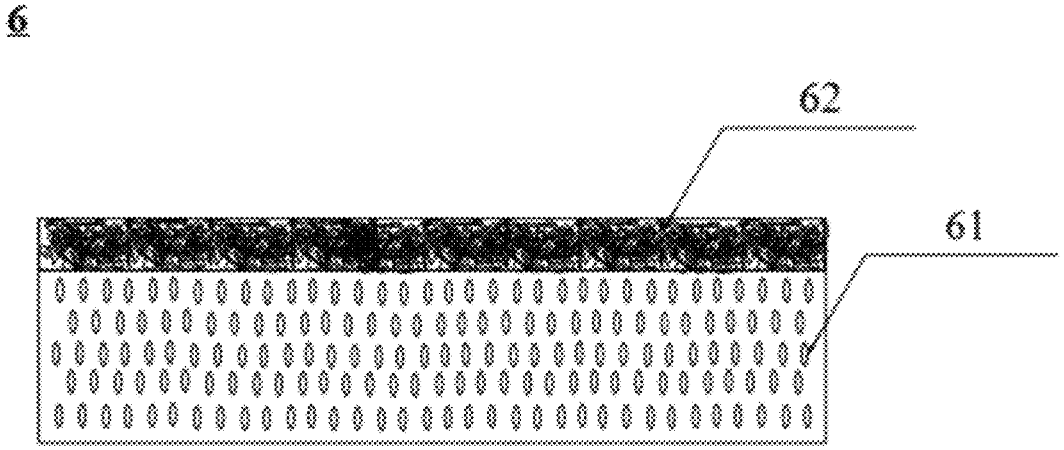
FIG. 1 is a schematic diagram of a separator according to an embodiment of the present application.

1 Battery pack
2 Upper case body
3 Lower case body
4 Battery module
5 Secondary battery
51 Housing
52 Electrode assembly
53 Top cover assembly
6 Separator

61 Substrate layer
62 Nanofiber layer
620 Nanofiber
63 Lithium supplementing agent
64 Polymer
651 Zero-dimensional conductive material
652 One-dimensional conductive material

DETAILED DESCRIPTION

Hereafter, embodiments of a separator for a secondary battery and a preparation method therefor, a secondary battery, a battery module, a battery pack, and a power consuming device of the present application are specifically disclosed in the detailed description with reference to the accompanying drawings as appropriate. However, unnecessary detailed illustrations may be omitted in some instances. For example, there are situations where detailed description of well-known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed in the text, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), etc.

The terms "comprise" and "include" mentioned in the present application are open-ended or closed-ended, unless otherwise stated. For example, the terms "comprising" and "including" may mean that other components not listed may also be comprised or included, or only the listed components may be comprised or included.

In the present application, the term "or" is inclusive unless otherwise specified. For example, the phrase "A or B" means "A, B, or both A and B". More specifically, a condition "A or B" is satisfied by any one of the following: A is true (or present) and B is false (or not present); A is false (or not present) and B is true (or present); or both A and B are true (or present).

In an embodiment of the present application, the present application provides a separator for a secondary battery, the separator including:

a substrate layer; and a nanofiber layer provided on one surface of the substrate layer, the nanofiber layer including a lithium supplementing agent, a polymer, and an optional conductive material, wherein in the total weight of the nanofiber layer, the content of the lithium supplementing agent accounts for 30.0-50.0%, the content of the polymer accounts for 50.0-70.0% and the content of the conductive material accounts for 0-5.0% by weight.

Although the mechanism is not yet clear, the applicant has unexpectedly discovered: as shown in FIG. 1, the present application provides a separator (6) for a secondary battery by providing a nanofiber layer (62) as a lithium supplementing agent layer, which includes a lithium supplementing agent, a polymer, and an optional conductive material, on one surface of a substrate layer (61). When the separator is applied to the secondary battery, the lithium supplementing agent is slowly released from the nanofiber layer during liquid injection and formation to exert a lithium supplementing effect. Specifically, the released lithium supplementing agent can participate in a film-forming reaction with a negative electrode to form an SEI film on a surface of the negative electrode, reducing irreversible lithium consumption of a positive electrode, thereby significantly improving an initial discharge capacity of the battery. Also, when there is insufficient active lithium in a cycling process, the active lithium stored in the negative electrode can participate in an electrochemical reaction in a timely manner, reducing the capacity attenuation of the battery.

Figure 2:
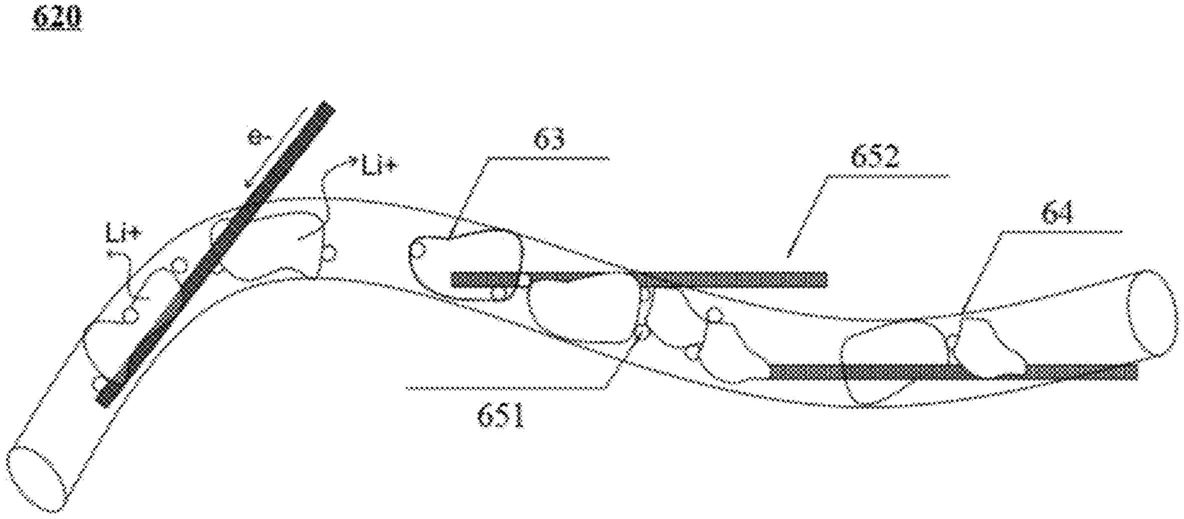
FIG. 2 is a schematic diagram of nanofibers in a nanofiber layer of a separator according to an embodiment of the present application.

More importantly, in the separator for a secondary battery of the present application, the nanofiber layer has a nanofiber structure formed by nanofibers (620) shown in FIG. 2, and thus the porosity is considerably high. By providing the lithium supplementing agent in the form of such a nanofiber layer, it is possible to effectively avoid blockage to pores of the substrate layer, to allow the transfer of lithium ions, and to further improve the infiltration and retention properties of an electrolyte by the separator, thereby fully ensuring continuous lithium ion migration of the lithium supplementing agent in the nanofiber layer. In the nanofiber layer, the polymer and the lithium supplementing agent act synergistically such that the utilization efficiency of the lithium supplementing agent can be improved, thereby improving the initial discharge capacity of the battery, improving the first coulombic efficiency of the battery, reducing the capacity attenuation of the battery, improving the cycling performance of the battery, and prolonging the battery life. Specifically, as shown in FIG. 2, the polymer (64) in the nanofiber layer can play a protective effect to avoid the failure of the lithium supplementing agent (63) in the nanofiber layer due to environmental influence; and by partially swelling the polymer (64), the slow release of the lithium supplementing agent (63) can be ensured. When the conductive material (e.g., a zero-dimensional conductive material (651) and a one-dimensional conductive material (652) as shown in FIG. 2) is included in the nanofiber layer, full mixing of the lithium supplementing agent and the conductive material can increase electron paths of the lithium supplementing agent in the nanofiber layer and further improve the utilization efficiency of the lithium supplementing agent, thereby further improving the initial discharge capacity of the battery, greatly improving the first coulombic efficiency of the battery, further reducing the capacity attenuation of the battery, greatly improving the cycling performance of the battery, and prolonging the battery life.

In addition, the product after the reaction of the lithium supplementing agent (63) is still encapsulated inside the polymer nanofiber (620), which can improve the strength of the nanofiber (620) and play a self-supporting role. Furthermore, in the present application, the nanofiber layer as the lithium supplementing agent layer does not contain substances affecting physical properties of the electrolyte such as the viscosity, an adverse effect of the dissolution of such substances on the migration of ions in the electrolyte is avoided, and thus the dynamic performance of the battery is fully ensured.

In the separator for a secondary battery of the present application, the content of the lithium supplementing agent accounts for 30.0-50.0%, the content of the polymer accounts for 50.0-70.0%, and the content of the conductive material accounts for 0-5.0% by weight in the total weight of the nanofiber layer. By respectively keeping the contents of the lithium supplementing agent, the polymer and the conductive material within the above ranges, it is possible to allow the nanofiber layer to have good processability.

In some embodiments, the conductive material may include a zero-dimensional conductive material and an optional one-dimensional conductive material. As shown in FIG. 2, the zero-dimensional conductive material (651) is dispersed inside the nanofibers (620) and fully mixed with the lithium supplementing agent (63) so that point-to-point electron paths can be provided. Therefore, the zero-dimensional conductive material (651) can promote the migration of electrons in the nanofiber layer and increase the electron paths of the lithium supplementing agent, so as to improve the utilization efficiency of the lithium supplementing agent. When the conductive material includes a one-dimensional conductive material, as shown in FIG. 2, the one-dimensional conductive material (652) may be partially exposed to the outside of the nanofiber (620), and the portion of the one-dimensional conductive material (652) exposed to the outside may not be coated with the polymer (64). Therefore, when the separator is applied to the secondary battery in such a manner that the nanofiber layer is provided on the surface of the substrate layer facing the positive electrode, the one-dimensional conductive material (652) can further promote the migration of the electrons in the nanofiber layer, and the partially exposed portion thereof can also additionally promote the migration of the electrons between the nanofiber layer and a positive electrode active material, thereby further improving the utilization efficiency of the lithium supplementing agent.

In the total weight of the nanofiber layer, the content of the zero-dimensional conductive material may account for 1.0-5.0% and the content of the one-dimensional conductive material may account for 0-0.3% by weight. By respectively keeping the contents of the zero-dimensional conductive material and the optional one-dimensional conductive material within the above ranges, it is possible to ensure that the conductive material fully exerts the above-mentioned effects without adversely affecting the processability of the nanofiber layer.

In some embodiments, the zero-dimensional conductive material may have a particle size of 30-50 nm. When the zero-dimensional conductive material has a particle size within the above range, more point-to-point electron paths can be realized with the same added amount, thereby further improving the utilization efficiency of the lithium supplementing agent.

In the present application, as long as the zero-dimensional conductive material can exert the above-mentioned effect of providing the point-to-point electron paths, the type of the zero-dimensional conductive material is not particularly limited, and a person skilled in the art would have been able to make a choice according to actual requirements. Optionally, the zero-dimensional conductive material may be selected from one or more of carbon black, acetylene black and Ketjen black.

In some embodiments, the one-dimensional conductive material may have a length-diameter ratio of 500-1,000. When the one-dimensional conductive material has a length-diameter ratio within the above range, it is possible to ensure that the one-dimensional conductive material fully exerts the above-mentioned additional effect of promoting the migration of the electrons between the nanofiber layer and the positive electrode active material, thereby further improving the utilization efficiency of the lithium supplementing agent.

In the present application, as long as the one-dimensional conductive material can exert the above-mentioned additional effect, the type of the one-dimensional conductive material is not particularly limited, and a person skilled in the art would have been able to make a choice according to actual requirements. Optionally, the one-dimensional conductive material may be a carbon nanotube, and optionally, a single-wall nanotube, a multi-wall nanotube, or a combination thereof. Since the carbon nanotube has good electrical conductivity and a small diameter, excessive volume occupation can be avoided.

In the present application, as long as the lithium supplementing agent can exert the above-mentioned lithium supplementing effect, the type of the lithium supplementing agent is not particularly limited, and a person skilled in the art would have been able to make a choice according to actual requirements. In some embodiments, the lithium supplementing agent is selected from one or more of $Li_2C_2O_4$, $C_4BLiO_8$, $Li_{15}Si_4$, $Li_4Sn$, $Li_2NiO_2$, LiF, $Li_2TiO_3$, $Li_2CrO_4$, $Li_2Cr_2O_7$, $Li_4SiO_4$, $Li_2SiO_3$, $Li_3AsO_4$, $Li_2SeO_4$, $Li_2SeO_3$, $LiVO_3$, $LiAlO_2$, $Li_3PO_4$, $Li_2B_8O_{13}$, $Li_2B_4O_7$, $LiBO_2$, $Li_3AlF_6$, $Li_2SnF_6$ and $LiAsF_6$, and optionally, one or more of $Li_2NiO_2$, $Li_4Sn$ and $LiAsF_6$.

In some embodiments, the lithium supplementing agent has a particle size of 50-200 nm, and optionally, 80-150 nm. When the lithium supplementing agent has a particle size within the above-mentioned range, it is possible to play the role of optimizing the diameter of the nanofibers, so that the nanofiber layer has an optimized structure, which not only can more effectively avoid the blockage to the pores of the substrate layer, but can also improve the infiltration and retention properties of the electrolyte by the separator and well promote the migration of the lithium ions of the lithium supplementing agent in the nanofiber layer.

In some embodiments, in 100 parts by weight of the polymer, the content of the lithium supplementing agent accounts for 40-100 parts by weight, and optionally, 60-80 parts by weight. When the amount of the lithium supplementing agent corresponding to the polymer is within the above-mentioned range, the synergistic effect between the polymer and the lithium supplementing agent can be facilitated to ensure that the lithium supplementing agent can be completely coated with the polymer, so as to play a fully protective role; meanwhile, the slow release of the lithium supplementing agent can be ensured, and thus the utilization efficiency of the lithium supplementing agent can be fully improved.

In some embodiments, in 100 parts by weight of the lithium supplementing agent, the content of the zero-dimensional conductive material accounts for 1-12.5 parts by weight; and the content of the one-dimensional conductive material accounts for 0.15-0.75 parts by weight. When the amounts of the zero-dimensional conductive material and the one-dimensional conductive material corresponding to the lithium supplementing agent are respectively within the above-mentioned ranges, good electronic conductivity can be ensured while the amount of the lithium supplementing agent is optimized, and the utilization efficiency of the lithium supplementing agent can be fully improved.

In the present application, as long as the polymer can be processed into a nanofiber material layer and is suitable for a separator for a secondary battery, the type of the polymer is not particularly limited, and a person skilled in the art would have been able to make a choice according to actual requirements. In some embodiments, the polymer is selected from one or more of polyvinylidene chloride, polyimide, polyacrylonitrile, and polystyrene.

In some embodiments, the nanofibers in the nanofiber layer have a diameter of 100-500 nm, and optionally, 200-250 nm. When the nanofibers have a diameter within the above-mentioned range, the formed nanofiber layer can have a high porosity, which not only can more effectively avoid the blockage to the pores of the substrate layer, but can also improve the infiltration and retention properties of the electrolyte by the separator and well promote the continuous lithium ion migration of the lithium supplementing agent in the nanofiber layer. In the present application, the diameter of the nanofibers can be controlled by adjusting process parameters such as the extrusion speed of a dispersion liquid for electrostatic spinning, the distance between a spinning head and a receiving end plate, and the voltage between the spinning head and the receiving end plate in an electrostatic spinning process for preparing the nanofiber layer, and a person skilled in the art would have been able to make a choice according to actual requirements.

In some embodiments, the nanofiber layer has a thickness of 1.0-5.0 μm, and optionally, 1.5-2.5 μm. When the nanofiber layer has a thickness within the above-mentioned range, it is possible to ensure that there is a sufficient amount of the lithium supplementing agent included in the nanofiber layer to exert a full lithium supplementing effect without occupying an excessive space and adversely affecting the performance of the separator. In the present application, the thickness of the nanofiber layer can be controlled by adjusting spinning time in the electrostatic spinning process for preparing the nanofiber layer, and a person skilled in the art would have been able to make a choice according to actual requirements.

In some embodiments, the nanofiber layer has a porosity of 80% or above. When the porosity of the nanofiber layer is up to 80% or above, not only the blockage to the pores of the substrate layer can be fully avoided, but also the infiltration and retention properties of the electrolyte by the separator can be improved, and the continuous lithium ion migration of the lithium supplementing agent in the nanofiber layer can be ensured.

The present application further provides a method for preparing a separator for a secondary battery, the method including:

dissolving a polymer in a solvent to obtain a polymer solution;

adding the polymer solution to a lithium supplementing agent or a blend of a lithium supplementing agent and a conductive material, and performing high-speed dispersion to obtain a dispersion liquid; and attaching the dispersion liquid to one surface of a substrate layer by means of electrostatic spinning to form a nanofiber layer, wherein in the total weight of the nanofiber layer, the content of the lithium supplementing agent accounts for 30.0-50.0%, the content of the polymer accounts for 50.0-70.0%, and the content of the conductive material accounts for 0-5% by weight.

The preparation method of the present application can effectively prepare the separator for a secondary battery in the first aspect of the present application.

In some embodiments, a solid content of the polymer solution may account for 20-40% by weight, and optionally, 20-25% by weight. When the solid content of the polymer solution is within the above-mentioned range, the dispersion liquid obtained by adding the polymer solution to the lithium supplementing agent or the blend of the lithium supplementing agent and the conductive material and performing high-speed dispersion will be suitable for the electrostatic spinning process, and it can be ensured that the nanofibers produced by means of the electrostatic spinning have a uniform diameter, the distribution of the lithium supplementing agent and/or the conductive material and the pore distribution of the nanofiber layer are uniform, and the lithium supplementing effect of the lithium supplementing agent and the performance of the separator are both stabilized.

In some embodiments, the nanofiber layer may have a thickness of 1.0-5.0 μm, and optionally, 1.5-2.5 μm. In the present application, the thickness of the nanofiber layer can be adjusted by adjusting the process parameters of electrostatic spinning steps, and a person skilled in the art would have been able to make a choice according to actual requirements.

The present application further provides a secondary battery, including:

a positive electrode;

a negative electrode;

an electrolyte; and a separator for a secondary battery of the present application as described above, wherein the nanofiber layer is provided on the surface of the substrate layer facing the positive electrode.

The present application further provides a battery module, including a secondary battery of the present application as described above.

The present application further provides a battery pack, including a battery module of the present application as described above.

The present application further provides a power consuming device, including at least one of a secondary battery of the present application as described above, a battery module of the present application as described above, and a battery pack of the present application as described above.

In the separator for a secondary battery of the present application, by providing the nanofiber layer as the lithium supplementing agent layer, which includes the lithium supplementing agent, the polymer and the optional conductive material, on one surface of the substrate layer, when the separator of the present application is applied to the secondary battery, the lithium supplementing agent can be slowly released from the nanofiber layer during liquid injection and formation, and participate in a negative electrode film-forming reaction to exert the lithium supplementing effect. More importantly, the nanofiber layer has the high porosity, which can effectively avoid the blockage to the pores of the substrate layer, and also improve the infiltration and retention properties of the electrolyte by the separator, thereby fully ensuring the continuous lithium ion migration of the lithium supplementing agent in the nanofiber layer. In addition, the polymer in the nanofiber layer and the lithium supplementing agent act synergistically so that the utilization efficiency of the lithium supplementing agent can be improved, thereby improving the initial discharge capacity of the battery, and reducing the capacity attenuation of the battery. The optional conductive material in the nanofiber layer can increase electron paths of the lithium supplementing agent in the nanofiber layer, and further improve the utilization efficiency of the lithium supplementing agent, thereby further improving the initial discharge capacity of the battery and further reducing the capacity attenuation of the battery. In addition, the product after the reaction of the lithium supplementing agent is still encapsulated inside the polymer nanofiber, which can improve the strength of the nanofiber and play a self-supporting role. Furthermore, the nanofiber layer as the lithium supplementing agent layer does not contain substances affecting physical properties of the electrolyte such as the viscosity, the adverse effect of the dissolution of such substances on the migration of ions in the electrolyte is avoided, and thus the dynamic performance of the battery is fully ensured.

The secondary battery, battery module, battery pack, and device of the present application will be described below by appropriately referring to the accompanying drawings.

In an embodiment of the present application, a secondary battery is provided.

Typically, the secondary battery includes a positive electrode plate, a negative electrode plate, an electrolyte and a separator. During a charge/discharge process of the battery, active ions are intercalated and de-intercalated back and forth between the positive electrode plate and the negative electrode plate. The electrolyte serves to conduct ions between the positive electrode plate and the negative electrode plate. The separator is provided between the positive electrode plate and the negative electrode plate, and mainly prevents positive and negative electrodes from short-circuiting and enables ions to pass through.

[Positive Electrode Plate]

The positive electrode plate may include a positive electrode current collector and a positive electrode film layer provided on at least one surface of the positive electrode current collector. As an example, the positive electrode current collector has two surfaces opposite in its own thickness direction, and the positive electrode film layer is provided on either or both of two opposite surfaces of the positive electrode current collector.

The positive electrode current collector may be a metal foil or a composite current collector. For example, an aluminum foil may be used as the metal foil. The composite current collector may include a polymer material substrate and a metal layer formed on at least one surface of the polymer material substrate. The composite current collector may be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

The above-mentioned positive electrode film layer includes a positive electrode active material, and the positive electrode active material includes, but is not limited to, lithium cobaltate, lithium nickel manganese cobaltate, lithium nickel manganese aluminate, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel-type lithium manganate, spinel-type lithium nickel manganate, lithium titanate, etc. One or more of these materials may be used as the positive electrode active material.

The positive electrode film layer further optionally includes a binder. However, the type of the binder is not particularly limited, and a person skilled in the art would have been able to make a choice according to actual requirements. As an example, the binder may include one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

The positive electrode film layer also optionally includes a conductive agent. However, the type of the conductive agent is not limited specifically, and can be selected by those skilled in the art according to actual requirements. As an example, the conductive agent for the positive electrode film layer may be selected from one or more of superconductive carbon, acetylene black, carbon black, Ketjen black, carbon dots, carbon nanotubes, graphene, and carbon nanofibers.

The positive electrode plate may be prepared by means of a method known in the art. As an example, the positive electrode active material, the conductive agent and the binder may be dispersed in a solvent (e.g., N-methylpyrrolidone (NMP)) to form a uniform positive electrode slurry; and the positive electrode slurry is coated onto a positive electrode current collector, and is then subjected to procedures such as drying and cold pressing, so as to obtain the positive electrode plate.

[Negative Electrode Plate]

The negative electrode plate may include a negative electrode current collector and a negative electrode film layer provided on at least one surface of the negative electrode current collector, the negative electrode film layer including a negative electrode active material. As an example, the negative electrode current collector has two surfaces opposite in its own thickness direction, and the negative electrode film layer is provided on either or both of the two opposite surfaces of the negative electrode current collector.

The negative electrode current collector may be a metal foil or a composite current collector. For example, a copper foil can be used as the metal foil. The composite current collector may include a polymer material substrate and a metal layer formed on at least one surface of the polymer material substrate. The composite current collector may be formed by forming a metal material (copper, a copper alloy, nickel, a nickel alloy, titanium, a titanium alloy, silver, a silver alloy, etc.) on a polymer material substrate (e.g., polypropylene (PP), polyethylene terephthalate (PET), polybutylene terephthalate (PBT), polystyrene (PS) and polyethylene (PE)).

In the secondary battery of the present application, the negative electrode film layer includes a negative electrode active material. The negative electrode active material may be the negative electrode active material commonly used in the art for preparing a negative electrode for a secondary battery, and as the negative electrode active material, artificial graphite, natural graphite, soft carbon, hard carbon, a silicon-based material, a tin-based material, lithium titanate and etc. may be listed. The silicon-based material may be selected from one or more of elemental silicon, a silicon-oxygen compound (e.g., silicon monoxide), a silicon-carbon compound, a silicon-nitrogen compound, and a silicon alloy. The tin-based material may be selected from one or more of elemental tin, a tin oxide compound and a tin alloy.

In the secondary battery of the present application, the negative electrode film layer may further include an optional binder, an optional conductive agent, and other optional auxiliaries.

As an example, the conductive agent may be selected from one or more of superconductive carbon, acetylene black, carbon black, Ketjen black, carbon dots, carbon nanotubes, graphene, and carbon nanofibers.

As an example, the binder may be selected from one or more of butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

The other optional auxiliaries are, for example, a thickening agent (for example, sodium carboxymethyl cellulose (CMC-Na)), etc.

The negative electrode plate may be prepared by means of a method known in the art. As an example, the negative electrode active material, the conductive agent, the binder, and any other components may be dispersed in a solvent (e.g., N-methylpyrrolidone (NMP) or deionized water) to form a uniform negative electrode slurry; and the negative electrode slurry is coated onto a negative electrode current collector, and is then subjected to procedures such as drying and cold pressing, so as to obtain the negative electrode plate.

[Electrolyte]

The electrolyte serves to conduct ions between the positive electrode plate and the negative electrode plate. The type of the electrolyte is not specifically limited in the present application, and can be selected according to actual requirements. For example, the electrolyte may be in a liquid state, a gel state or an all-solid state.

In some embodiments, the electrolyte is an electrolyte solution. The electrolyte solution includes an electrolyte salt and a solvent.

As examples, the electrolyte salt can be selected from one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluorooxalate borate (LiDFOB), lithium dioxalate borate (LiBOB), lithium difluorophosphate ($LiPO_2F_2$), lithium bisoxalatodifluorophosphate (LiDFOP) and lithium tetrafluorooxalate phosphate (LiTFOP).

As examples, the solvent may be selected from one or more of fluoroethylene carbonate (FEC), ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolyte also optionally includes an additive. For example, the electrolyte can include a negative electrode film-forming additive, a positive electrode film-forming additive, an additive to improve the overcharge performance of a battery, an additive to improve the high temperature performance of a battery, and an additive to improve the low temperature performance of a battery, etc.

[Separator]

The separator separates the positive electrode plate from the negative electrode plate, prevents short-circuiting inside the battery, and also allows active ions to pass through the separator and move between the positive and negative electrodes. In the secondary battery of the present application, the separator for a secondary battery of the present application as described above is used as a separator for exerting the above-mentioned effect, and the separator is provided with a nanofiber layer as a lithium supplementing agent layer, which includes a lithium supplementing agent, a polymer and an optional conductive material, on one surface of a substrate layer.

The type of the substrate layer is not particularly limited in the present application, and any well-known substrate layer with good chemical stability and mechanical stability may be used. In some embodiments, any well-known porous structure film for a secondary battery may be used as the substrate layer of the separator for a secondary battery of the present application. For example, the substrate layer may be selected from one or more of a glass fiber film, a non-woven fabric film, a polyethylene (PE) film, a polypropylene (PP) film, a polyvinylidene fluoride film, and a multilayer composite substrate layer including one or two or more thereof. In some embodiments, a polyolefin microporous film commonly used in the art may be used as the substrate layer for the separator for a secondary battery of the present application.

A nanofiber layer having a high porosity may be formed on one surface of a substrate layer as a lithium supplementing agent layer by means of the electrostatic spinning process according to the preparation method of the present application. In the electrostatic spinning process for preparing the nanofiber layer, the diameter of the nanofibers can be controlled to be 100-500 nm, and optionally, 200-250 nm, by adjusting the process parameters such as the extrusion speed of the dispersion liquid for electrostatic spinning, the distance between the spinning head and the receiving end plate, and the voltage between the spinning head and the receiving end plate; and by adjusting the spinning time, the thickness of the nanofiber layer can be controlled to be 1.0-5.0 μm, and optionally, 1.5-2.5 μm.

In some embodiments, the positive electrode plate, the negative electrode plate and the separator may be made into an electrode assembly by means of a winding process or a lamination process. In the present application, when the electrode assembly is assembled, the nanofiber layer as the lithium supplementing agent layer faces a positive electrode surface, and the substrate layer faces a negative electrode surface.

In some embodiments, the secondary battery may include an outer package. The outer package may be used to package the electrode assembly and electrolyte as described above.

In some embodiments, the outer package of the secondary battery may be a hard shell, such as a hard plastic shell, an aluminum shell, or a steel shell. The outer package of the secondary battery may also be a soft bag, such as a pouch-type soft bag. The material of the soft bag may be plastics, and the examples of plastics may include polypropylene (PP), polybutylene terephthalate (PBT), and polybutylene succinate (PBS), etc.

Figure 3:
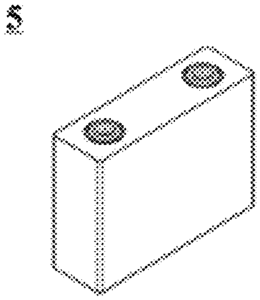
FIG. 3 is a schematic diagram of a secondary battery according to an embodiment of the present application.

The shape of the secondary battery is not particularly limited in the present application, and may be cylindrical, square or of any other shape. For example, FIG. 3 shows a secondary battery 5 with a square structure as an example.

Figure 4:
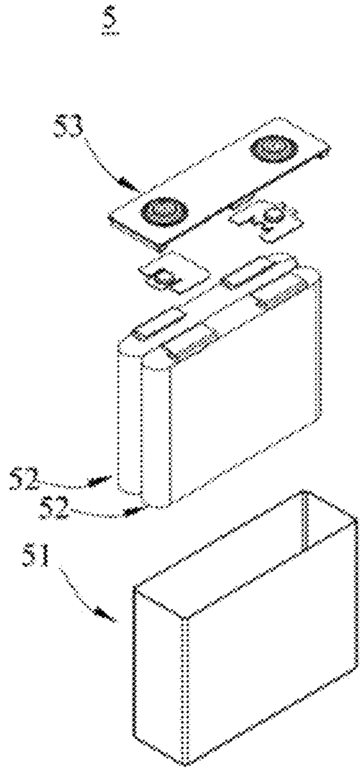
FIG. 4 is an exploded view of the secondary battery according to an embodiment of the present application shown in FIG. 3.

In some embodiments, referring to FIG. 4, the outer package may include a housing 51 and a cover plate 53. Herein, the housing 51 may include a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can form an electrode assembly 52 by a winding process or a lamination process. The electrode assembly 52 is packaged in the accommodating cavity. The electrolyte is infiltrated into the electrode assembly 52. The number of the electrode assemblies 52 contained in the secondary battery 5 may be one or more, and can be selected by those skilled in the art according to actual requirements.

In some embodiments, the secondary battery can be assembled into a battery module, the number of the secondary batteries contained in the battery module may be one or more, and the specific number can be selected by those skilled in the art according to the application and capacity of the battery module.

Figure 5:
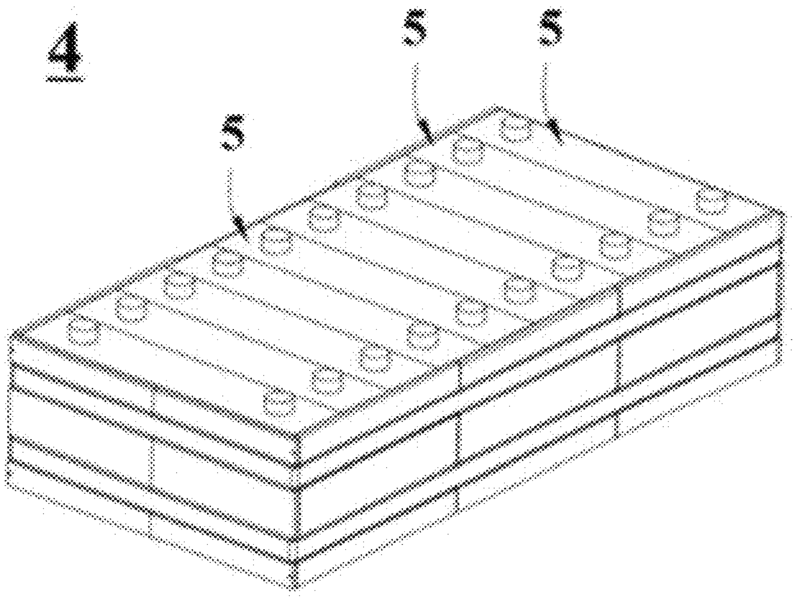
FIG. 5 is a schematic diagram of a battery module according to an embodiment of the present application.

FIG. 5 shows a battery module 4 as an example. Referring to FIG. 5, in the battery module 4, a plurality of secondary batteries 5 may be sequentially arranged in the length direction of the battery module 4. Apparently, the secondary batteries may also be arranged in any other manner. Furthermore, the plurality of secondary batteries 5 may be fixed by fasteners.

Optionally, the battery module 4 may also include a housing with an accommodating space, and a plurality of secondary batteries 5 are accommodated in the accommodating space.

In some embodiments, the battery module can also be assembled into a battery pack, and the number of the battery modules contained in the battery pack can be selected by those skilled in the art according to the application and capacity of the battery pack.

Figure 6:
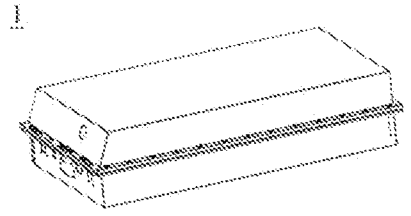
FIG. 6 is a schematic diagram of a battery pack according to an embodiment of the present application.
Figure 7:
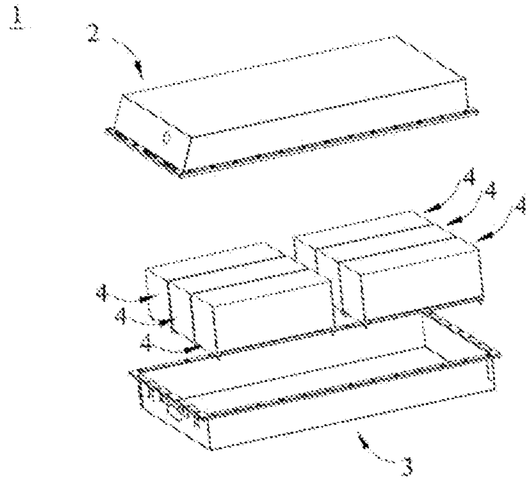
FIG. 7 is an exploded view of the battery pack according to an embodiment of the present application shown in FIG. 6.

FIG. 6 and FIG. 7 show a battery pack 1 as an example. Referring to FIGS. 6 and 7, a battery case and a plurality of battery modules 4 provided in the battery case may be included in the battery pack 1. The battery case includes an upper case body 2 and a lower case body 3, wherein the upper case body 2 can cover the lower case body 3 to form a closed space for accommodating the battery modules 4. A plurality of battery modules 4 may be arranged in the battery case in any manner.

In addition, the present application further provides a power consuming device, including at least one of the secondary battery, the battery module, or the battery pack provided by the present application. The secondary battery, the battery module or the battery pack may be used as a power supply or an energy storage unit of the power consuming device. The power consuming device may include, but is not limited to a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, ship and satellite, an energy storage system, and the like.

As a power consuming device, the secondary battery, battery module or battery pack can be selected according to the usage requirements thereof.

Figure 8:
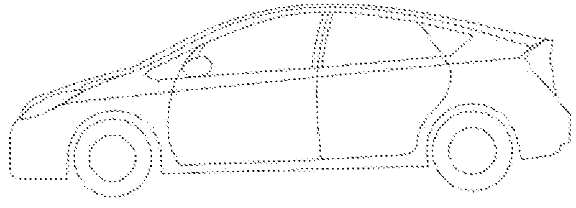
FIG. 8 is a schematic diagram of a power consuming device using a secondary battery according to an embodiment of the present application as a power supply.

FIG. 8 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

As another example, the power consuming device may be a mobile phone, a tablet, a laptop computer, etc. The power consuming device is generally required to be thin and light, and may use a secondary battery as a power supply.

EXAMPLES

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

Preparation of Separator

A polyethylene microporous film having a thickness of about 7 m was used as a substrate layer of a separator for a secondary battery of the present application. A nanofiber layer including a lithium supplementing agent, a polymer, and an optional conductive material was formed on one surface of the substrate layer by means of an electrostatic spinning process. A dispersion liquid for electrostatic spinning was prepared as follows.

A polymer (e.g., one or more of polyvinylidene chloride, polyimide, polyacrylonitrile, and polystyrene) was dissolved in a solvent (e.g., one or more of N-methylpyrrolidone (NMP), dimethylacetamide (DMAC), and dimethyl formamide (DMF)) and stirred to form a transparent and uniform polymer solution as component A. Component A had a solid content of about 20-25% by weight. A lithium supplementing agent was used as component B. In addition, optionally, the lithium supplementing agent and the conductive material were stirred and mixed in an inert atmosphere to form a uniformly mixed blend as component B. Component A was added to component B and stirred at a high speed of about 1,000-1,500 rpm/min for about 1-1.5 hours until a uniform dispersion liquid for electrostatic spinning was formed.

An electrostatic spinning machine (ELITE, Beijing Ucalery Industry Technology Development Co., Ltd.) was used, the voltage to be applied between a spinning head and a receiving end plate is set to be 10-20 KV, and the distance between the spinning head and the receiving end plate was set to be 10-30 cm. Under the conditions of a temperature of 20-35° C. and a humidity of 2-40% RH, the dispersion liquid obtained in the above step was sprayed to one surface of the substrate layer by means of the spinning head with an inner diameter of 1-2 mm, the spraying thickness was 1.0-5.0 μm, and a nanofiber layer directly attached to one surface of the substrate layer was formed thereon. In the obtained nanofiber layer, the content of the lithium supplementing agent accounts for about 30.0-50.0%, the content of the polymer accounts for about 50.0-70.0%, and the content of the conductive material accounts for about 0-5% by weight in the total weight of the nanofiber layer. After the obtained composite layer including the substrate layer and the nanofiber layer was dried at a temperature of about 80-95° C., a separator having the nanofiber layer as a lithium supplementing agent layer was obtained.

Preparation of Cell

In the example of the present application, a cell was prepared by using the following method.

(1) Preparation of Positive Electrode Plate

A positive electrode active material $Ni_5Co_2Mn_3$ (NCM523, Beijing Easpring Material Technology Co., Ltd.), conductive carbon (Super-P—Li, TIMCAL Corp.), and a binder polyvinylidene fluoride (PVDF) (5130, Solvay Corp., U.S.A.) were added to N-methyl pyrrolidone (NMP) in a weight ratio of 97:1.5:1.5 and fully stirred for uniform mixing, and a positive electrode slurry with a solid content of 72% was obtained. The positive electrode slurry was uniformly applied to an aluminum foil with a coating amount of 0.156 $mg/mm^2$ by means of a conventional process using an extrusion coater or a transfer coater, and dried at 100-130° C. to obtain a positive electrode plate.

(2) Preparation of Negative Electrode Plate

A negative electrode active material silicon monoxide (Xinjiang Jingshuo New Material Co., Ltd.), conductive carbon (Super-P—Li, TIMCAL Corp.), and a binder PVDF (5130, Solvay Corp., U.S.A.) were added to the NMP in a weight ratio of 95:2:3 and fully stirred for uniform mixing, and a negative electrode slurry with a solid content of 52% was obtained. The negative electrode slurry was uniformly applied to a copper foil with a coating amount of 0.106 $mg/mm^2$ by means of a conventional process using an extrusion coater or a transfer coater, and dried at 100-130° C. to obtain a negative electrode plate.

(3) Preparation of Battery

The positive electrode plate/negative electrode plate obtained in the above step was sized corresponding to the specification as required by a core design. The negative electrode plate, the separator, and the positive electrode plate were wound in such a manner that the nanofiber layer of the separator faced a positive electrode surface to obtain a Jelly Roll, and assembly and liquid injection were then performed. The electrolyte used was a solution (having a molarity of 1 mol/L) of $LiPF_6$ in a mixed solvent of dimethyl carbonate (DMC), diethyl carbonate (DEC) and ethylene carbonate (EC) in a volume ratio of 1:1:1. After formation and capacity grading, a lithium ion battery was obtained.

Performance Test (1) Porosity

The separator having the nanofiber layer is punched into a small wafer having an area $S_0$, the small wafer is weighed, its weight is recorded as $m_2$, and the thickness $h_1$ of the small wafer is measured. Then, after the small wafer of the separator is soaked in isobutanol (having a density of $\rho_1$) for 0.5 hour, it is taken out and weighed, and its weight is recorded as $m_3$. The substrate layer having no nanofiber layer is punched into a small wafer having the same area $S_1$, the small wafer is weighed, its weight is recorded as $m_0$, and the thickness $h_0$ of the small wafer is measured. Then, after the small wafer of the substrate layer is soaked in isobutanol (having a density of $\rho_1$) for 1 hour, it is taken out and weighed, and its weight is recorded as $m_1$. The porosity of the nanofiber layer is calculated according to the following formula:

$$\text{Porosity}=\{[(m_3-m_2)-(m_1-m_0)]/[\rho_1(h_1-h_0)\times S_0]\}\times 100\%$$

(2) First Coulombic Efficiency

The first charge capacity of the battery is designed to be a releasable capacity of 75 Ah. To measure the first discharge capacity, the battery is first fully charged to 4.2 V at a constant current of 0.33 C and a constant voltage of 0.05 C; and after standing for 1 hour, the battery is discharged to 2.8 V at a constant current of 0.33 C, and the discharge capacity is recorded as a first discharge capacity C. The first coulombic efficiency is calculated according to the following formula:

$$\text{First coulombic efficiency}=(C/75)\times 100\%.$$

(3) Capacity Retention Rate

The new battery is charged and discharged at a rate of 0.33 C at a normal temperature of 25° C., and the discharge capacity is recorded as an initial capacity $C_0$ at that time. Then, the battery is charged at a rate of 1 C and discharged at a rate of 1 C at a normal temperature of 25° C., and the discharge capacity after 1,800 cycles is recorded as $C_1$. The capacity retention rate is calculated according to the following formula:

$$\text{Capacity retention rate}=(C_1/C_0)\times 100\%.$$

Example 1

A polymer polyvinylidene chloride (PVDF) was added to an NMP solvent in a mass ratio of 20:80 and stirred to form a transparent and uniform polymer solution as component A. A lithium supplementing agent $Li_2NiO_2$ having a particle size of 100 nm was used as component B. Component A was added to component B in a mass ratio of 15:2 under an inert atmosphere and stirred at a high speed of about 1,000 rpm/min for about 1.2 hours until a uniform dispersion liquid was formed for electrostatic spinning.

The electrostatic spinning was performed at a temperature of 25° C., a humidity of 15% RH, and an applied voltage of 15 kV. Nanofibers having a diameter of 200 nm may be obtained by spraying the above dispersion liquid to one surface of a substrate layer polyethylene microporous film having a thickness of about 7 m by means of a spinning head having an inner diameter of 1 mm. By controlling the electrostatic spinning time, a nanofiber layer having a thickness of about 1.5 m was finally obtained as a lithium supplementing agent layer. In the total weight of the nanofiber layer, the content of the lithium supplementing agent accounts for about 30.0% and the content of the polymer accounts for about 70.0% by weight. After the obtained composite layer including the substrate layer and the nanofiber layer was dried at a temperature of about 110-130° C., the separator in Example 1 was obtained.

The porosity of the nanofiber layer of the separator in Example 1 was measured by means of the test method described above.

A lithium ion battery was prepared by means of the method described above using the separator in Example 1. The first coulombic efficiency and the capacity retention rate of the battery prepared with the separator in Example 1 were then measured by means of the test method described above.

Comparative Example 1

A polymer PVDF was added to an NMP solvent in a mass ratio of 20:80 to obtain a polymer solution. A lithium supplementing agent $Li_2NiO_2$ was added to the polymer solution in a mass ratio of 2:15 under an inert atmosphere and stirred uniformly, and then the solution was filtered and dried to obtain polymer-coated composite particles. The composite particles were added to the NMP solvent, mixed uniformly, and then applied to one surface of a substrate layer the same as the substrate layer in Example 1 to form a coating layer having a thickness of about 1.5 m as a lithium supplementing agent layer, without forming a nanofiber structure. With regard to the coating layer, in the total weight of the coating layer, the content of the lithium supplementing agent accounted for about 40.0% and the content of the polymer accounted for about 60.0% by weight. After the obtained composite layer including the substrate layer and the coating layer was dried at a temperature of about 80-95° C., a separator of Comparative example 1 was obtained. In the separator of Comparative example 1, the lithium supplementing agent layer is a conventional coating layer and does not have a porous structure.

A lithium ion battery was prepared using the separator of Comparative example 1 by means of a method similar to that described above, wherein the coating layer of the separator faced a positive electrode surface while a negative electrode plate, the separator, and a positive electrode plate were wound into a roll. The first coulombic efficiency and the capacity retention rate of the battery prepared with the separator of Comparative example 1 were then measured by means of the test method described above.

Examples 2-3 and Comparative Examples 2-3

Separators and secondary batteries were prepared by means of a method substantially the same as in Example 1, and the difference only lies in that in the prepared nanofibers, the content of the lithium supplementing agent and the content of the polymer relative to the total weight of the nanofiber layer are shown in Table 1.

The porosity of the nanofiber layer of the separator in Examples 2-3 and Comparative examples 2-3, and the first coulombic efficiency and capacity retention rate of the battery prepared with the separator in Examples 2-3 and Comparative examples 2-3 were respectively measured by means of the test method described above.

The content of the lithium supplementing agent and the content of the polymer in the lithium supplementing agent layer in Examples 1-3 and Comparative examples 1-3 as well as the measured porosity, first coulombic efficiency and capacity retention rate are shown in Table 1.

TABLE 1

| | Content | | | | |
|---|---|---|---|---|---|
| | Lithium supplementing agent | Polymer | Porosity | First coulombic efficiency | Capacity retention rate |
| Example 1 | 40.0% | 60.0% | 82% | 90% | 85% |
| Example 2 | 30.0% | 70.0% | 83% | 90% | 85% |
| Example 3 | 50.0% | 50.0% | 82% | 91% | 83% |
| Comparative example 1 | 40.0% | 60.0% | / | 80% | 75% |
| Comparative example 2 | 25.0% | 75.0% | 83% | 75% | 71% |
| Comparative example 3 | 55.0% | 45.0% | 80% | 78% | 72% |

As can be seen from the above results, compared with Comparative example 1 in which the lithium supplementing agent layer is a nonporous coating layer including a lithium supplementing agent and a polymer, in Examples 1-3, since the porosity of the nanofiber layer including the lithium supplementing agent and the polymer and being formed on the substrate layer is up to 82% or above, the blockage to the pores in the substrate layer is avoided, the infiltration and retention properties of the electrolyte by the separator are improved, and continuous lithium ion migration of the lithium supplementing agent is ensured. In particular, in Example 1 and Comparative example 1, the same content of the lithium supplementing agent and the same content of the polymer are included in the lithium supplementing agent layer, but the difference therebetween only lies in that the two have a nanofiber layer structure and a coating layer structure respectively. In Examples 1-3, a nanofiber-forming polymer effectively avoided the failure of the lithium supplementing agent, and allowed the lithium supplementing agent to be slowly released during slow swelling, so that the initial discharge capacity of the battery was improved, the first coulombic efficiency of the battery was increased to 90% or above, the cycling performance of the battery was improved, and the capacity retention rate was up to 83% or above after 1,800 cycles.

Moreover, in Comparative examples 2 and 3, the initial discharge capacity and cycling performance of the battery were not improved. The reasoning could be that, in Comparative examples 2 and 3, both the content of the lithium supplementing agent and the content of the polymer were out of the ranges of 30.0-50.0% and 50.0-70.0% by weight, respectively. In Comparative example 2, the content of the lithium supplementing agent was too low and the content of the polymer was too high, resulting in that the polymer coating the surface of the lithium supplementing agent was too thick, which was not conducive to the removal of lithium ions. Therefore, in Example 2, the initial discharge capacity and cycling performance of the battery were deteriorated. In Comparative example 3, the content of the lithium supplementing agent was too high and the content of the polymer was too low, resulting in that the surface of the lithium supplementing agent was difficult to be completely coated with the polymer during the electrostatic spinning, and resulting in that part of the lithium supplementing agent was inactivated due to exposure to air, thereby failing to effectively supply lithium ions. Furthermore, when the content of the lithium supplementing agent is too high, the electrostatic spinning process was also adversely affected, resulting in insufficient porosity of the formed nanofiber layer. Therefore, in Example 2, the initial discharge capacity and cycling performance of the battery were deteriorated.

Examples 4-8

Separators and secondary batteries were prepared by means of a method substantially the same as in Example 1, and the difference only lies in that carbon black, a zero-dimensional conductive material having a particle size of about 40 nm, was added to component B, and the lithium supplementing agent and the conductive material were stirred and mixed under an inert atmosphere to form a uniformly mixed blend.

The added amount of the zero-dimensional conductive material and the amounts of component A and component B were adjusted, and in the prepared nanofibers, the contents of the lithium supplementing agent, the polymer and the zero-dimensional conductive material relative to the total weight of the nanofiber layer are shown in Table 2.

The porosity of the nanofiber layer of the separator in Examples 4-8 and the first coulombic efficiency and capacity retention rate of the battery prepared with the separator in Examples 4-8 were respectively measured by means of the test method described above, and results are shown in Table 2.

TABLE 2

| | Content | | | | | |
|---|---|---|---|---|---|---|
| | Lithium supplementing agent | Polymer | Zero-dimensional conductive material | Porosity | First coulombic efficiency | Capacity retention rate |
| Example 4 | 40.0% | 59.0% | 1% | 82% | 92% | 87% |
| Example 5 | 40.0% | 57.0% | 3% | 82% | 92% | 87% |
| Example 6 | 40.0% | 55.0% | 5% | 82% | 93% | 87% |
| Example 7 | 40.0% | 59.2% | 0.8% | 82% | 91% | 87% |
| Example 8 | 40.0% | 54.8% | 5.2% | 82% | 93% | 85% |

As can be seen from the above results, compared with Examples 1-3, in Examples 4-8, since the zero-dimensional conductive material capable of providing a point-to-point path is further added in the nanofiber layer, the migration of electrons in the nanofiber layer is facilitated, and the utilization efficiency of the lithium supplementing agent is improved by increasing the electron paths of the lithium supplementing agent. In Examples 4-8, the initial discharge capacity of the battery is further increased, the first coulombic efficiency of the battery is increased to 91% or above, the cycling performance of the battery is improved, and the capacity retention rate is up to 85% or above after 1,800 cycles.

Moreover, compared with Examples 7 and 8, in Examples 4-6, the initial discharge capacity of the battery is further increased, the first coulombic efficiency of the battery is increased to 92% or above, the cycling performance of the battery is improved, and the capacity retention rate is up to 87% or above after 1,800 cycles.

Examples 9-21

Separators and secondary batteries were prepared by means of a method substantially the same as in Example 4, and the difference lies in that a one-dimensional conductive material single-wall carbon nanotube having a length-diameter ratio of about 800 was further added to component B. In the prepared nanofibers, the contents of the lithium supplementing agent, the polymer, the zero-dimensional conductive material and the one-dimensional conductive material relative to the total weight of the nanofiber layer are shown in Table 3.

The porosity of the nanofiber layer of the separator in Examples 9-21 and the first coulombic efficiency and capacity retention rate of the battery prepared with the separator in Examples 9-21 were respectively measured by means of the test method described above, and results are shown in Table 3.

TABLE 3

| | Content | | | | | | |
|---|---|---|---|---|---|---|---|
| | Lithium supplementing agent | Polymer | Zero-dimensional conductive material | One-dimensional conductive material | Porosity | First coulombic efficiency | Capacity retention rate |
| Example 9 | 40.0% | 56.9% | 3.0% | 0.1% | 82% | 92% | 92% |
| Example 10 | 40.0% | 56.8% | 3.0% | 0.2% | 80% | 94% | 93% |
| Example 11 | 40.0% | 56.7% | 3.0% | 0.3% | 83% | 93% | 93% |
| Example 12 | 32.5% | 65.0% | 2.3% | 0.2% | 80% | 92% | 90% |
| Example 13 | 42.5% | 55.0% | 2.3% | 0.2% | 82% | 93% | 92% |
| Example 14 | 37.5% | 60.0% | 2.3% | 0.2% | 81% | 92% | 91% |
| Example 15 | 40% | 59.59% | 0.4% | 0.01% | 80% | 91% | 90% |
| Example 16 | 40% | 57.9% | 2.0% | 0.10% | 80% | 93% | 89% |
| Example 17 | 40% | 55.9% | 4.0% | 0.10% | 80% | 93% | 89% |
| Example 18 | 40% | 57.92% | 2.0% | 0.08% | 81% | 93% | 91% |
| Example 19 | 40% | 57.8% | 2.0% | 0.20% | 80% | 92% | 90% |
| Example 20 | 40% | 57.94% | 2.0% | 0.06% | 80% | 90% | 88% |
| Example 21 | 40% | 57.78% | 2.0% | 0.22% | 81% | 91% | 91% |

As can be seen from the above results, compared with Examples 4-8, in Examples 9-21, since the one-dimensional conductive material capable of being partially exposed to the outside of the nanofibers is further added to the nanofibers, not only can the migration of the electrons in the nanofiber layer be further promoted, but also the partially exposed portion thereof can additionally promote the migration of the electrons between the nanofiber layer and the positive electrode active material, and thus the utilization efficiency of the lithium supplementing agent is further improved. As a result, in Examples 9-21, the initial discharge capacity of the battery was improved, the first coulombic efficiency of the battery remained 90% or above, the cycling performance of the battery was also greatly improved, and the capacity retention rate was up to 89% or above after 1,800 cycles.

In Examples 13 and 14, with respect to 100 parts by weight of the polymer, the content of the lithium supplementing agent accounted for 77 parts and 62.5 parts by weight, respectively, which are in a preferred range of 60-80 parts by weight. As a result, compared with Example 12 in which the content of the lithium supplementing agent is 50 parts by weight, the capacity retention rate of the battery was improved somewhat after 1,800 cycles.

Examples 22-25

Separators and secondary batteries were prepared by means of a method substantially the same as in Example 4, and the difference only lies in that the zero-dimensional conductive material carbon black added to component B has a particle size as shown in Table 4.

The porosity of the nanofiber layer of the separator in Examples 22-25 and the first coulombic efficiency and capacity retention rate of the battery prepared with the separator in Examples 22-25 were respectively measured by means of the test method described above, and results are shown in Table 4. For ease of comparison, the porosity of the nanofiber layer of the separator in Example 4 and the first coulombic efficiency and the capacity retention rate of the battery prepared with the separator in Example 4 are also listed in Table 4.

TABLE 4

| | Particle size of zero-dimensional conductive material (nm) | Porosity | First coulombic efficiency | Capacity retention rate |
|---|---|---|---|---|
| Example 22 | 25 | 82% | 91% | 84% |
| Example 23 | 30 | 82% | 92% | 88% |
| Example 4 | 40 | 82% | 92% | 87% |
| Example 24 | 50 | 82% | 92% | 86% |
| Example 25 | 55 | 79% | 91% | 85% |

As can be seen from the above results, compared with Examples 22 and 25, in Examples 4, 23 and 24, the zero-dimensional conductive material has a particle size in a preferred range of 30-50 nm. Therefore, more point-to-point electron paths can be realized with the same added amount without adversely affecting the electrostatic spinning process, thereby ensuring a further improvement of the utilization efficiency of the lithium supplementing agent. As a result, in Examples 4, 23 and 24, the initial discharge capacity of the battery was improved, the first coulombic efficiency of the battery was up to 92%, the cycling performance of the battery was greatly improved, and the capacity retention rate was up to 86% or above after 1,800 cycles.

Examples 26-30

Separators and secondary batteries were prepared by means of a method substantially the same as in Example 4, and the difference lies in that the one-dimensional conductive material single-wall carbon nanotube has a length-diameter ratio as shown in Table 5 was added to component B. In addition, in the prepared nanofibers, the contents of the lithium supplementing agent, the polymer, the zero-dimensional conductive material, and the one-dimensional conductive material respectively accounted for 39.8%, 59%, 1%, and 0.2% relative to the total weight of the nanofiber layer.

The porosity of the nanofiber layer of the separator in Examples 26-30 and the first coulombic efficiency and capacity retention rate of the battery prepared with the separator in Examples 26-30 were respectively measured by means of the test method described above, and results are shown in Table 5.

TABLE 5

| | Length-diameter ratio | Porosity | First coulombic efficiency | Capacity retention rate |
|---|---|---|---|---|
| Example 26 | 450 | 82% | 93% | 90% |
| Example 27 | 500 | 81% | 94% | 91% |
| Example 28 | 750 | 81% | 92% | 91% |
| Example 29 | 1000 | 81% | 94% | 91% |
| Example 30 | 1050 | 79% | 93% | 90% |

As can be seen from the above results, compared with Examples 26 and 30, in Examples 27-29, the one-dimensional conductive material has a length-diameter ratio in a preferred range of 500-1000 nm. Therefore, the one-dimensional conductive material can sufficiently exert its additional effect of promoting the migration of electrons between the nanofiber layer and the positive electrode active material, thereby ensuring a further improvement of the utilization efficiency of the lithium supplementing agent. As a result, in Examples 27-29, the initial discharge capacity of the battery was improved, the first coulombic efficiency of the battery remained 92% or above, the cycling performance of the battery was also improved, and the capacity retention rate was up to 91% or above after 1,800 cycles.

Examples 31-34

Separators and secondary batteries were prepared by means of a method substantially the same as in Example 4, and the difference lies in that the lithium supplementing agent has a particle size as shown in Table 6.

The porosity of the nanofiber layer of the separator in Examples 31-34 and the first coulombic efficiency and capacity retention rate of the battery prepared with the separator in Examples 31-34 were respectively measured by means of the test method described above, and results are shown in Table 6. For ease of comparison, the porosity of the nanofiber layer of the separator in Example 4 and the first coulombic efficiency and the capacity retention rate of the battery prepared with the separator in Example 4 are also listed in Table 6.

TABLE 6

| | Particle size of lithium supplementing agent (nm) | Porosity | First coulombic efficiency | Capacity retention rate |
|---|---|---|---|---|
| Example 31 | 50 | 82% | 89% | 83% |
| Example 32 | 80 | 82% | 90% | 85% |
| Example 4 | 100 | 82% | 90% | 85% |
| Example 33 | 150 | 82% | 90% | 85% |
| Example 34 | 200 | 79% | 90% | 82% |

As can be seen from the above results, in Examples 4 and 31-34, the lithium supplementing agent has a particle size in a preferred range of 50-200 nm and plays the role of optimizing the diameter of the nanofibers such that the nanofiber layer has a better structure, thereby effectively avoiding the blockage to the pores of the substrate layer, improving the infiltration and retention properties of the electrolyte by the separator, and better promoting the continuous lithium ion migration of the lithium supplementing agent in the nanofiber layer. As a result, in Examples 4 and 31-34, the initial discharge capacity of the battery was improved, the first coulombic efficiency of the battery was up to 89% or above, the cycling performance of the battery was also improved, and the capacity retention rate was up to 82% or above after 1,800 cycles.

In Examples 4, 32 and 33, the lithium supplementing agent had a particle size in a further preferred range of 80-150 nm, the initial discharge capacity of the battery was further improved, the first coulombic efficiency of the battery was up to 90%, the cycling performance of the battery was further improved, and the capacity retention rate was up to 85% after 1,800 cycles.

Examples 35-39

Separators and secondary batteries were prepared by means of a method substantially the same as in Example 9, and the difference lies in that the inner diameter of the spinning head was adjusted in the electrostatic spinning process. The diameter of the nanofibers is as shown in Table 7. In addition, in the prepared nanofibers, the contents of the lithium supplementing agent, the polymer, the zero-dimensional conductive material, and the one-dimensional conductive material respectively accounted for 39.8%, 59.0%, 1.0%, and 0.2% relative to the total weight of the nanofiber layer.

The porosity of the nanofiber layer of the separator in Examples 35-39 and the first coulombic efficiency and capacity retention rate of the battery prepared with the separator in Examples 35-39 were respectively measured by means of the test method described above, and results are shown in Table 7.

TABLE 7

| | Diameter of nanofibers (nm) | Porosity | First coulombic efficiency | Capacity retention rate |
|---|---|---|---|---|
| Example 35 | 100 | 81% | 92% | 91% |
| Example 36 | 200 | 82% | 92% | 92% |
| Example 37 | 250 | 82% | 95% | 92% |
| Example 38 | 300 | 80% | 92% | 91% |
| Example 39 | 500 | 75% | 91% | 89% |

As can been seen from the above results, in Examples 35-39, the nanofiber layer has a diameter in a preferred range of 100-500 nm, such that the nanofiber layer has a better structure, thereby more effectively avoiding the blockage to the pores of the substrate layer, improving the infiltration and retention properties of the electrolyte by the separator, and better promoting the continuous lithium ion migration of the lithium supplementing agent in the nanofiber layer. As a result, in Examples 35-39, the initial discharge capacity of the battery was greatly improved, the first coulombic efficiency of the battery was up to 91% or above, the cycling performance of the battery was improved, and the capacity retention rate was up to 89% or above after 1,800 cycles.

In Examples 36 and 37, the diameter of the nanofibers was in a further preferred range of 200-250 nm, the initial discharge capacity of the battery was further improved, the first coulombic efficiency of the battery was up to 94% or above, the cycling performance of the battery was further improved, and the capacity retention rate remained 92% or above after 1,800 cycles.

Examples 40-43

Separators and secondary batteries were prepared by means of a method substantially the same as in Example 14, and the difference lies in that the electrostatic spinning time was adjusted in the electrostatic spinning process. The thickness of the formed nanofiber layer is as shown in Table 8.

The porosity of the nanofiber layer of the separator in Examples 40-43 and the first coulombic efficiency and capacity retention rate of the battery prepared with the separator in Examples 40-43 were respectively measured by means of the test method described above, and results are shown in Table 8. For ease of comparison, the porosity of the nanofiber layer of the separator in Example 14 and the first coulombic efficiency and the capacity retention rate of the battery prepared with the separator in Example 14 are also listed in Table 8.

TABLE 8

| | Thickness of nanofiber layer (μm) | Porosity | First coulombic efficiency | Capacity retention rate |
|---|---|---|---|---|
| Example 40 | 1.0 | 82% | 94% | 91% |
| Example 14 | 1.5 | 82% | 96% | 92% |
| Example 41 | 2.5 | 82% | 97% | 93% |
| Example 42 | 3.0 | 82% | 98% | 89% |
| Example 43 | 5.0 | 82% | 98% | 89% |

As can be seen from the above results, in Examples 14 and 40-43, the nanofiber layer has a thickness in a preferred range of 1.0-5.0 μm, which facilitates a sufficient amount of the lithium supplementing agent in the nanofiber layer, and the exertion of a full lithium supplementing effect, without occupying excessive space and adversely affecting the performance of the separator. As a result, in Examples 14 and 40-43, the initial discharge capacity of the battery was greatly improved, the first coulombic efficiency of the battery was up to 94% or above, the cycling performance of the battery was greatly improved, and the capacity retention rate was up to 89% or above after 1,800 cycles.

In Examples 14 and 41, the nanofiber layer has a thickness in a further preferred range of 1.5-2.5 μm, the initial discharge capacity of the battery is further improved, the first coulombic efficiency of the battery is up to 96% or above, the cycling performance of the battery is further improved, and the capacity retention rate is up to 92% or above after 1,800 cycles.

Examples 44-46

Separators and secondary batteries were prepared by means of a method substantially the same as in Example 9, and the difference lies in that during the preparation of component A, the formed polymer solution has a solid content as shown in Table 9.

The porosity of the nanofiber layer of the separator in Examples 44-46 and the first coulombic efficiency and capacity retention rate of the battery prepared with the separator in Examples 44-46 were respectively measured by means of the test method described above, and results are shown in Table 9. For ease of comparison, the porosity of the nanofiber layer of the separator in Example 9 and the first coulombic efficiency and the capacity retention rate of the battery prepared with the separator in Example 9 are also listed in Table 9.

TABLE 9

| | Solid content | Porosity | First coulombic efficiency | Capacity retention rate |
|---|---|---|---|---|
| Example 9 | 20% | 82% | 92% | 92% |
| Example 44 | 25% | 82% | 92% | 92% |
| Example 45 | 30% | 82% | 91% | 91% |
| Example 46 | 40% | 79% | 91% | 90% |

As can be seen from the above results, in Examples 9 and 44-46, the polymer solution during the preparation of the dispersion liquid for electrostatic spinning has a solid content in a preferred range of 20-40%. Therefore, the dispersion liquid obtained by adding the polymer solution to the lithium supplementing agent or the blend of the lithium supplementing agent and the conductive material and performing high-speed dispersion is very suitable for the electrostatic spinning process, thereby ensuring that the nanofibers produced by means of the electrostatic spinning have a more uniform diameter, the distribution of the lithium supplementing agent and/or the conductive material and the pore distribution of the nanofiber layer are more uniform, and also ensuring that the lithium supplementing effect of the lithium supplementing agent and the performance of the separator are both stabilized. As a result, in Examples 9 and 44-46, the initial discharge capacity of the battery was excellent, the first coulombic efficiency of the battery was up to 91% or above, the cycling performance of the battery was further improved, and the capacity retention rate was up to 90% or above after 1,800 cycles.

It should be noted that the present application is not limited to the above embodiments. The above embodiments are exemplary only, and any embodiment that has substantially same constitutions as the technical ideas and has the same effects within the scope of the technical solutions of the present application falls within the technical scope of the present application. Furthermore, various modifications to the embodiments that can be conceived by those skilled in the art, and other implementations constructed by combining some of the constituent elements of the embodiments also fall within the scope of the present application without departing from the spirit of the present application.

INDUSTRIAL APPLICABILITY

The separator of the present application has a nanofiber layer as a lithium supplementing agent layer, which includes a lithium supplementing agent, a polymer and an optional conductive material, greatly improving the utilization efficiency of the lithium supplementing agent, greatly improving the initial discharge capacity of a secondary battery when applied to the battery, improving the cycling performance of the battery, and prolonging the battery life. Therefore, the present application is suitable for industrial applications.

What is claimed is:

1. A separator for a secondary battery, comprising:

a substrate layer; and a nanofiber layer provided on one surface of the substrate layer, wherein the nanofiber layer comprises a lithium supplementing agent, a polymer, and a conductive material, in the total weight of the nanofiber layer, the content of the lithium supplementing agent accounts for 30.0-50.0% by weight, the content of the polymer accounts for 50.0-70.0% by weight, and the content of the conductive material accounts for 0-5.0% by weight.

2. The separator according to claim 1, wherein the conductive material comprises a zero-dimensional conductive material and an one-dimensional conductive material, and in the total weight of the nanofiber layer, the content of the zero-dimensional conductive material accounts for 1.0-5.0% by weight, and the content of the one-dimensional conductive material accounts for 0-0.3% by weight.

3. The separator according to claim 2, wherein the zero-dimensional conductive material has a particle size of 30-50 nm; and the zero-dimensional conductive material is selected from one or more of carbon black, acetylene black and Ketjen black.

4. The separator according to claim 2, wherein the one-dimensional conductive material has a length-diameter ratio of 500-1,000; and the one-dimensional conductive material is a carbon nanotube, a single-wall nanotube, a multi-wall nanotube, or a combination thereof.

5. The separator according to claim 1, wherein the lithium supplementing agent is selected from one or more of $Li_2C_2O_4$, $C_4BLiO_8$, $Li_{15}Si_4$, $Li_4Sn$, $Li_2NiO_2$, LIF, $Li_2TiO_3$, $Li_2CrO_4$, $Li_2Cr_2O_7$, $Li_4SiO_4$, $Li_2SiO_3$, $Li_3AsO_4$, $Li_2SeO_4$, $Li_2SeO_3$, $LiVO_3$, $LiAlO_2$, $Li_3PO_4$, $Li_2B_8O_{13}$, $Li_2B_4O_7$, $LiBO_2$, $Li_3AlF_6$, $Li_2SnF_6$ and $LiAsF_6$, and one or more of $Li_2NiO_2$, $Li_4Sn$ and $LiAsF_6$.

6. The separator according to claim 1, wherein the lithium supplementing agent has a particle size of 50-200 nm.

7. The separator according to claim 1, wherein in 100 parts by weight of the polymer, the content of the lithium supplementing agent accounts for 40-100 parts by weight.

8. The separator according to claim 2, wherein in 100 parts by weight of the lithium supplementing agent, the content of the zero-dimensional conductive material accounts for 1-12.5 parts by weight; and the content of the one-dimensional conductive material accounts for 0.15-0.75 parts by weight.

9. The separator according to claim 1, wherein the polymer is selected from one or more of polyvinylidene chloride, polyimide, polyacrylonitrile, and polystyrene.

10. The separator according to claim 1, wherein the nanofibers in the nanofiber layer have a diameter of 100-500 nm.

11. The separator according to claim 1, wherein the nanofiber layer has a thickness of 1.0-5.0 μm.

12. The separator according to claim 1, wherein the nanofiber layer has a porosity of 80% or above.

13. A method for preparing a separator for a secondary battery, comprising:

dissolving a polymer in a solvent to obtain a polymer solution;

adding the polymer solution to a lithium supplementing agent or a blend of a lithium supplementing agent and a conductive material, and performing high-speed dispersion to obtain a dispersion liquid; and attaching the dispersion liquid to one surface of a substrate layer by means of electrostatic spinning to form a nanofiber layer;

wherein in the total weight of the nanofiber layer, the content of the lithium supplementing agent accounts for 30.0-50.0% by weight, the content of the polymer accounts for 50.0-70.0% by weight, and the content of the conductive material accounts for 0-5% by weight.

14. The method according to claim 13, wherein a solid content of the polymer solution accounts for 20-40% by weight.

15. The method according to claim 13, wherein the nanofiber layer has a thickness of 1.0-5.0 μm.

16. A secondary battery, comprising:

a positive electrode;

a negative electrode;

an electrolyte; and the separator according to claim 1, wherein the nanofiber layer is provided on the surface of the substrate layer facing the positive electrode.

17. A battery module, comprising the secondary battery according to claim 16.

18. A battery pack, comprising the battery module according to claim 17.

19. A power consuming device, comprising the battery pack according to claim 18.

* * * * *